United States Patent [19]
Tingstad

[11] Patent Number: 5,509,688
[45] Date of Patent: Apr. 23, 1996

[54] VEHICLE WEIGHT TRANSFER SUBFRAME

[76] Inventor: Dennis Tingstad, 3205 McLeod Rd., Westbank, British Columbia, Canada, V4T 1A6

[21] Appl. No.: 251,335

[22] Filed: May 31, 1994

[30]  Foreign Application Priority Data

Apr. 19, 1994 [CA] Canada ................................ 2121617

[51] Int. Cl.⁶ ...................................................... B62D 63/06
[52] U.S. Cl. ................... 280/789; 180/24.01; 280/438.1; 280/439
[58] Field of Search ...................................... 280/781, 788, 280/789, 790, 438.1, 439, 440; 180/24.01

[56]   References Cited

U.S. PATENT DOCUMENTS

| | | | |
|---|---|---|---|
| 23,704 | 9/1853 | De Lay | 280/33.05 |
| 1,866,637 | 7/1932 | Fageol | 180/24.01 |
| 2,741,489 | 4/1956 | Bigge | 280/44 |
| 2,821,409 | 1/1958 | Chalmers | 280/789 |
| 3,257,124 | 6/1966 | Mendez | 280/439 |
| 3,312,479 | 4/1967 | Cunha | 280/407 |
| 3,439,935 | 4/1969 | Guidice | 280/407 |
| 3,448,993 | 6/1969 | Gorge et al. | 280/439 |
| 3,784,219 | 1/1974 | Van Der Burgt et al. | 280/788 |
| 4,029,335 | 6/1977 | Cady et al. | 280/439 |
| 4,411,444 | 10/1983 | Holloway | 280/405 A |
| 5,088,570 | 2/1992 | Loeber | 180/24.01 |
| 5,328,198 | 7/1994 | Adams | 280/440 |

FOREIGN PATENT DOCUMENTS

1324996   5/1963   France .................................. 280/440

Primary Examiner—Eric D. Culbreth
Attorney, Agent, or Firm—Chernoff, Vilhauer, McClung & Stenzel

[57]   ABSTRACT

A weight transfer subframe for a tandem steer tractor having a tractor frame has a longitudinal subframe member having forward and rearward ends, the longitudinal subframe member pivotally mounted at the rearward end to the tractor frame and the forward end of the longitudinal subframe member vertically engaging a weight bearing member of the tractor for transferring weight to an opposed pair of front wheels of the tractor, a load transfer trailer coupling device mountable on the longitudinal subframe member between the forward and rearward ends.

8 Claims, 10 Drawing Sheets

VEHICLE WEIGHT TRANSFER SUBFRAME

FIELD OF THE INVENTION

This invention relates to the field of truck frame structures and in particular to the structure of tractor frames for bearing a proportion of the weight of the tractor load.

BACKGROUND OF THE INVENTION

The gross vehicle weight of tractor-trailer combinations is, conventionally, limited by the weight that can be placed on the fifth-wheel coupling on the tractor, which coupling is normally mounted to the truck frame. The load placed on the fifth-wheel coupling is generally balanced between the front and rear of the tractor.

The applicant is aware of U.S. Reissue Pat. No. 23,704, which reissued on Sep. 1, 1953 to Manford S. De Lay for a "Load Equalizing Device". DeLay teaches a fifth-wheel coupling mounted on a translatable carriage for translation longitudinally along the longitudinal members of a tractor frame. The carriage is secured at desired positions along the tractor frame by actuable pins extending from the carriage and journalled in holes in the longitudinal frame members. The De Lay device is known in the art as a fifth-wheel slider.

The applicant is also aware of U.S. Pat. No. 3,493,935 which issued on Apr. 22, 1969 to W. W. Guidice for a "Fifth Wheel Tractor" device. Guidice discloses a subframe pneumatically mounted at its ends onto a tractor frame, the fifth wheel coupling point being adjustable longitudinally by translation of the fifth wheel kingpin. Limited weight transfer between the forward and rearward wheels of the tractor is accomplished by tilting of the subframe on its pneumatic mounts.

The present invention provides a subframe weight transfer device to apportion to the front wheels of a tandem steer tractor some of the load otherwise transferred to the rear wheels of the tractor by the fifth-wheel coupling or like load transfer coupling device. It is a further object of this invention to thus allow for an increase in gross tractor-trailer vehicle weight, that is, including trailer load, by increasing the load bearing capacity of the tractor transferred to the tractor by a fifth-wheel coupling or like load transfer coupling device, while maintaining the requisite tractor weight balance and minimizing the over all increase in vehicle tare weight.

SUMMARY OF THE INVENTION

The present invention consists of a subframe pivotally mounted at one end to the tractor frame of a tandem steer tractor, above the rear axles of the tractor, the other end of the subframe being supported by a tractor front axle, and in a tandem steer configuration attaching to the rear-most axle of the front wheel tandem steer assembly, assuming the rear-most axle has adjustable suspension. Alternatively some other load transfer point at the front end of the tractor may be employed, such as load-distributing bridging members between the front and rear steering axles in the case of non-adjustable rear steering axle suspension. A fifth-wheel coupling or like load transfer coupling device is mounted onto the subframe so that the subframe acts to transfer to the front wheels some of the load applied to the load transfer coupling which would otherwise be imparted directly to the rear wheels of the tractor. A proportion of the load on the load transfer coupling is thus carried forward to the front wheels of the tractor.

DETAILED DESCRIPTION OF PREFERRED EMBODIMENTS

Figure 1:
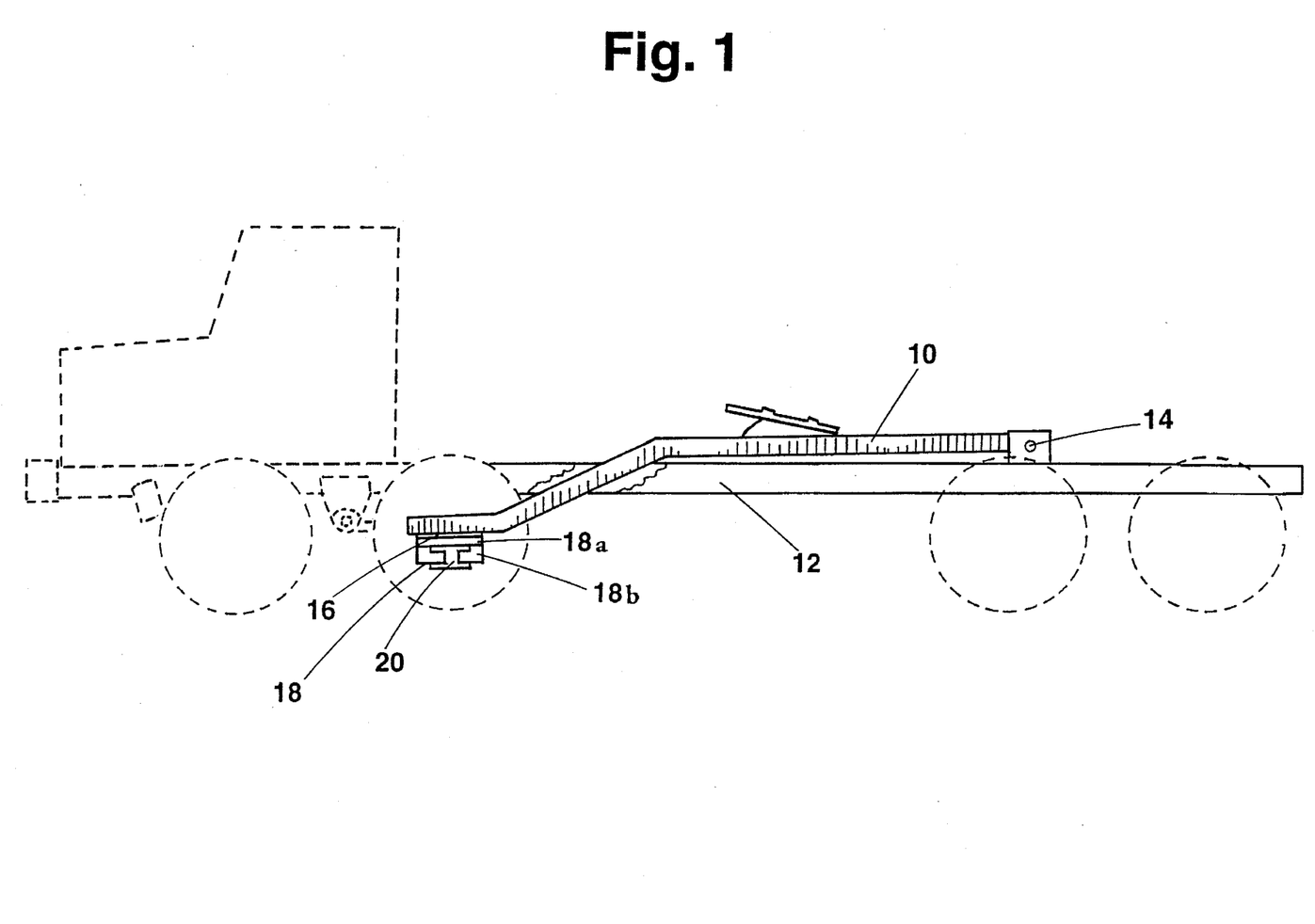
FIG. 1 is, in side elevation view, the weight transfer subframe of the present invention.

FIG. 1 illustrates a weight transfer subframe of the present invention installed on a tandem steer tractor as illustrated in outline. Subframe 10 is pivotally mounted to tractor frame 12 about bushing 14 at the rear-most end of subframe 10. The forward end of subframe 10 rests on wear pads 16 which are mounted on wear pad mounting brackets 18. Wear pad mounting brackets 18 are mounted astride an "I"-beam steering axle 20, such as a Rockwell™ 931 series non-driving "I"-beam centre design steering axle.

Figure 2:
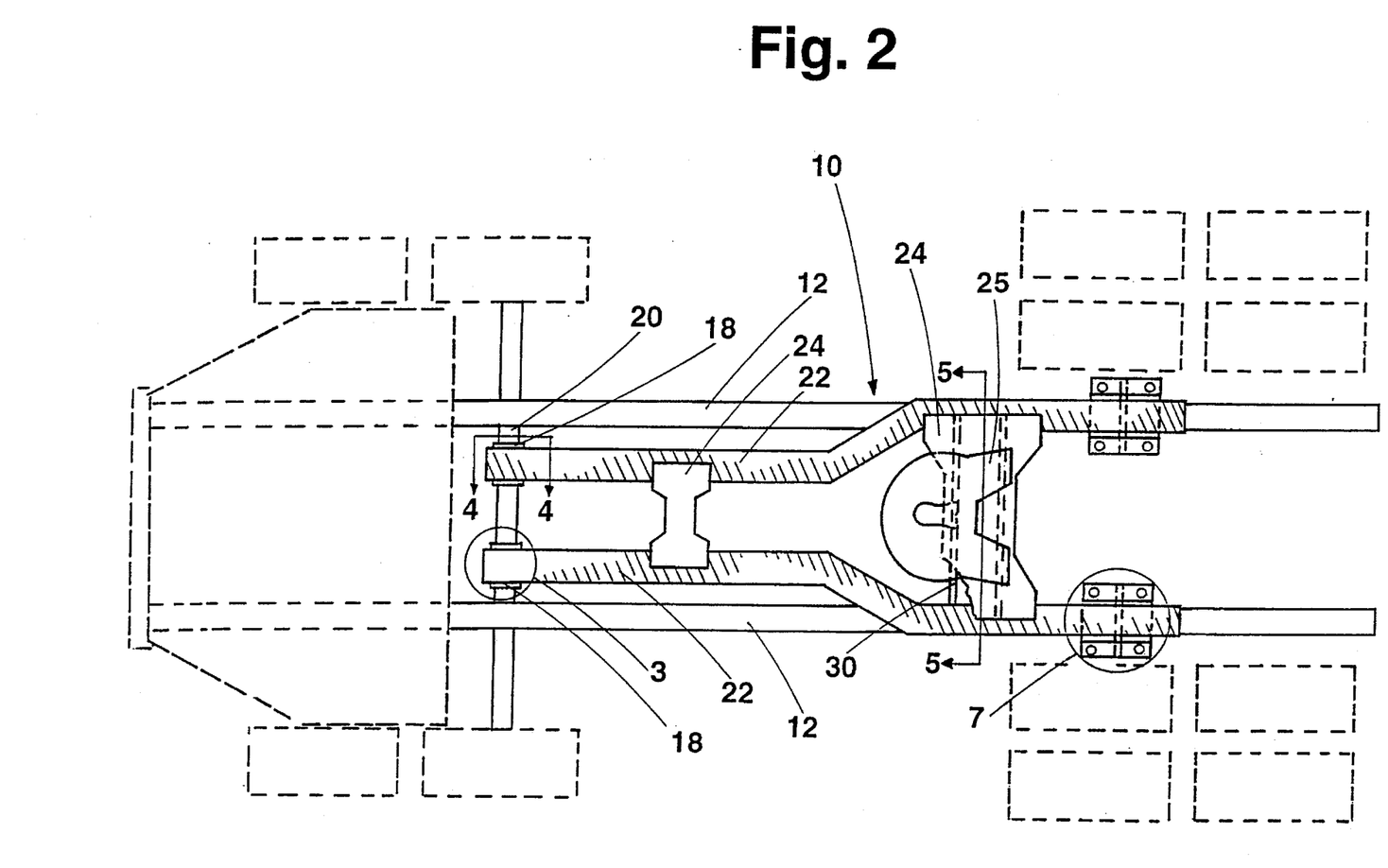
FIG. 2 is, in plan view, the weight transfer subframe of the present invention depicted in FIG. 1.

As illustrated in FIG. 2, subframe 10 has two substantially parallel longitudinal members 22 and cross members 24. Fifth-wheel coupling 25 or like load transfer coupling device is mounted atop a cross-member 24.

An example of the relative positioning of subframe 10 and tractor frame 12 would be as follows: assuming a 17,500 kgs maximum legal drive axle weight and a 6,000 kgs maximum legal steering axle weight and the front of subframe 10 mounted to the rear-most steering axle 20 of a tandem steer tractor, the pivotally mounted end of subframe 10 (i.e., at bushing 14) would be mounted to tractor frame 12 approximately 8 to 12 inches forward of a point midway between the tractor drive axles. Fifth wheel coupling 25 would be mounted to a cross member 24 forward a distance approximately one-third of the distance from the point midway between the tractor drive axles to the rearmost steering axle 20.

Wear pads 16 and wear pad mounting brackets 18 would be mounted to axle 20 to the interior of, for example, the Ridewell™ suspension mounting points on a Rockwell™

931 series steering axle. It is understood that the present embodiment assumes tandem axle steering having independent front suspension, the front steering axle having for example a spring suspension for bearing the weight of the front of the tractor, the rear steering axle having adjustable airbag suspension or other adjustable suspension adjustable to bear the transferred load of a loaded trailer.

It is further understood that cross members 24 should not interfere with the tractor drive line (not shown). Cross members 24 may be supported by two parallel vertical flanges 30 (see also FIGS. 5 & 6), all welded into place, and made of heavy plate of greater than one-quarter inch thickness depending on the specific load requirements of the tractor. It is understood that vertical flanges 30 need to be thin enough to allow torsional flexing without cracking of the heavy plate material.

Figure 3:
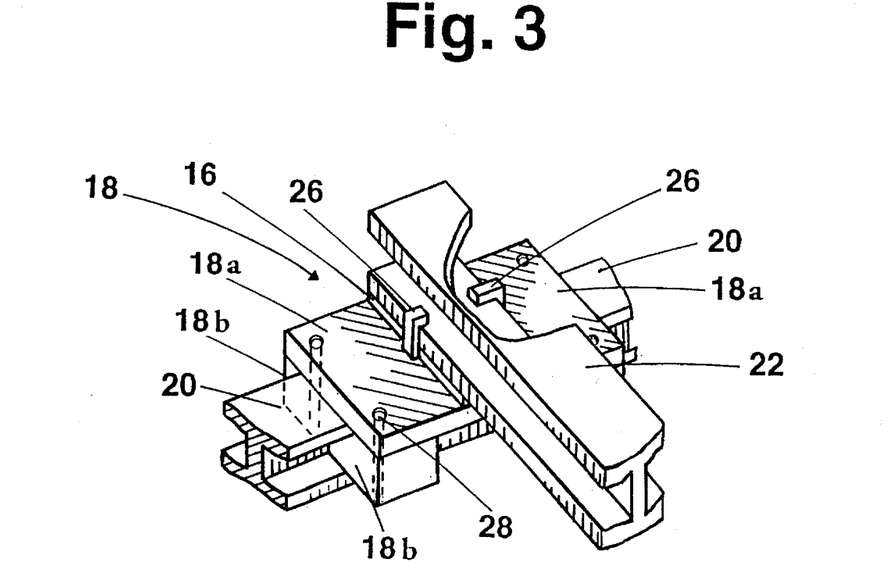
FIG. 3 is, in perspective view, a detailed breakout from FIG. 2.

As illustrated in FIG. 3, longitudinal members 22 are held in position on wear pads 16 and wear pad mounting brackets 18 by guides 26. If longitudinal members 22 are of "I"-beam construction then guides 26, which are rigidly mounted to wear pads 16, may be angle brackets which act to hold longitudinal members 22 vertically in place on wear pads 16 but do not restrict small longitudinal movements of longitudinal members 22 relative to wear pad 16. Guides 26 may be snugged onto the lower flanges of longitudinal subframe members 22 to prevent substantial vertical movement of longitudinal subframe members 22 relative to "I"-beam steering axle 20. However, guides 26 should not be so snug as to prevent a rocking motion of longitudinal sub-frame members 22 relative to bracket 18. Alternatively, instead of guides 26, rubber bushings (not shown) in mounting brackets affixed to bracket 18 may be employed. Longitudinal members 22 may then be held by pins journalled in the rubber bushings and through members 22. The rubber bushings would allow for small longitudinal movements of members 22 as do guides 26.

Of course, any other such free floating securement would also suffice.

Figure 4:
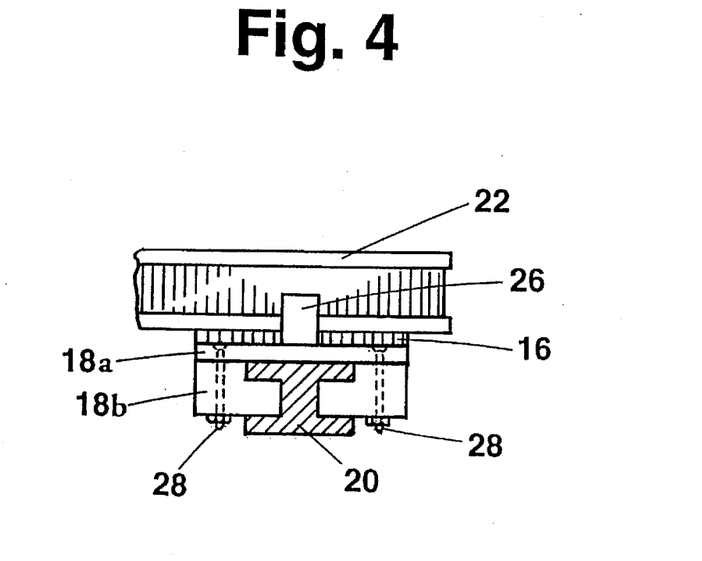
FIG. 4 is a cross sectional view along line 4—4 in FIG. 2.

As illustrated in FIG. 4, wear pad mounting bracket 18 may be made up of an upper bracket plate 18a and lower angle brackets 18b. Upper plate 18a and lower angle brackets 18b are secured by bolts 28. Wear plate 16 may be made of replaceable plastic or neoprene or mild steel, possibly ⅜ of an inch in thickness and secured to upper plate 18a by countersunk bolts or screws (not shown).

Figure 5:
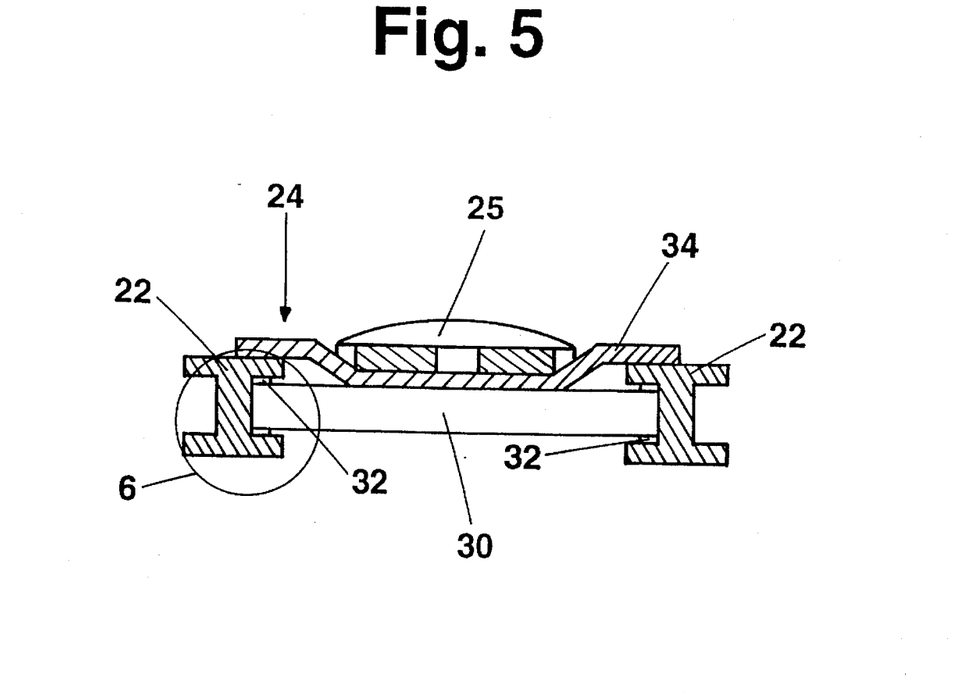
FIG. 5 is a cross sectional view along line 5—5 in FIG. 2.
Figure 6:
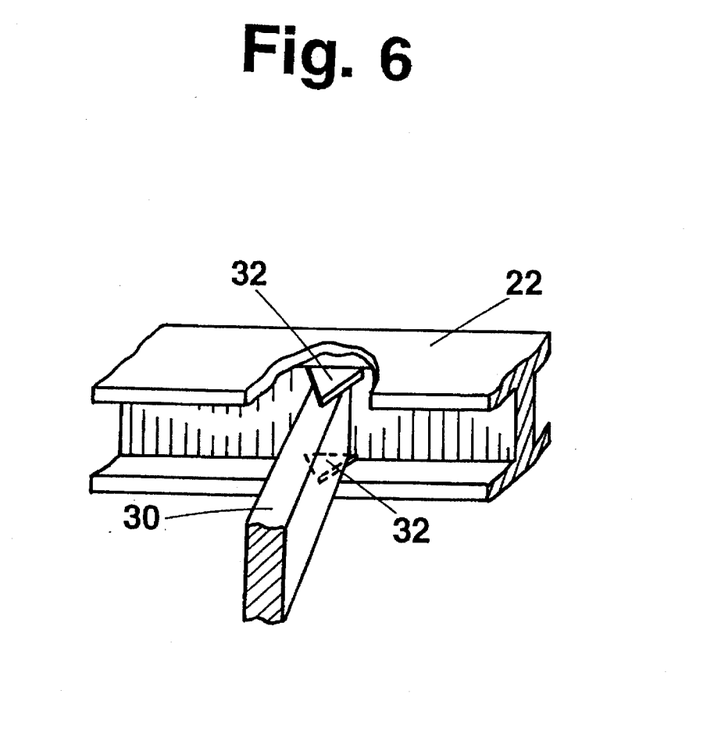
FIG. 6 is, in perspective view, a detailed view of a portion of FIG. 5.

As illustrated in FIG. 5, cross members 24 have vertical flanges 30 extending between longitudinal members 22. Cross members 24 are secured, by welding, to longitudinal members 22 by gussets 32 and cross member plates 34. The arrangement of gussets 32 securing vertical flanges 30 to longitudinal members 22 is better illustrated in FIG. 6.

Figure 7:
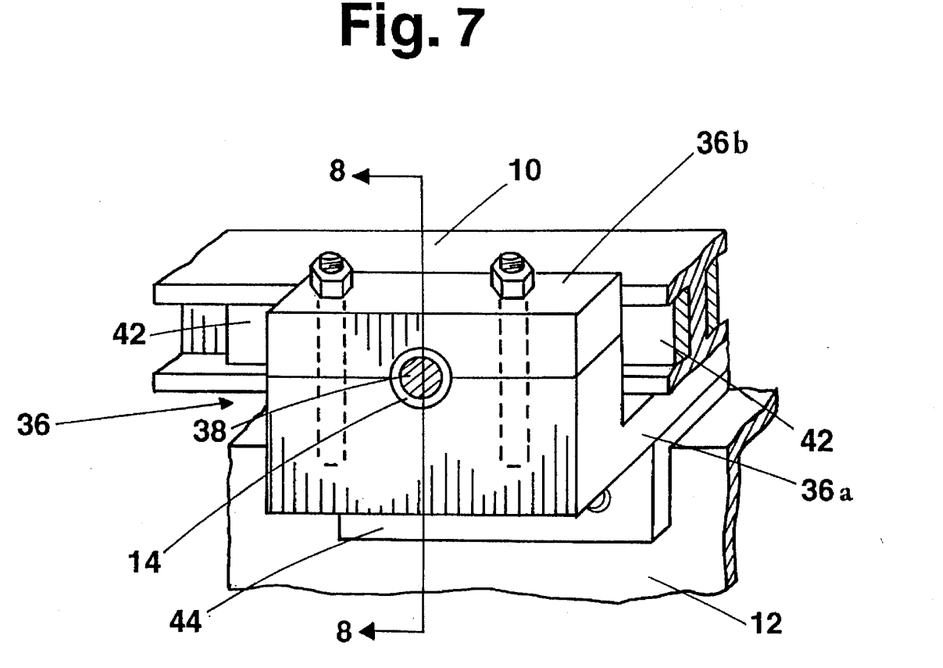
FIG. 7 is, in perspective view, a detailed view of a portion of FIG. 2.
Figure 8:
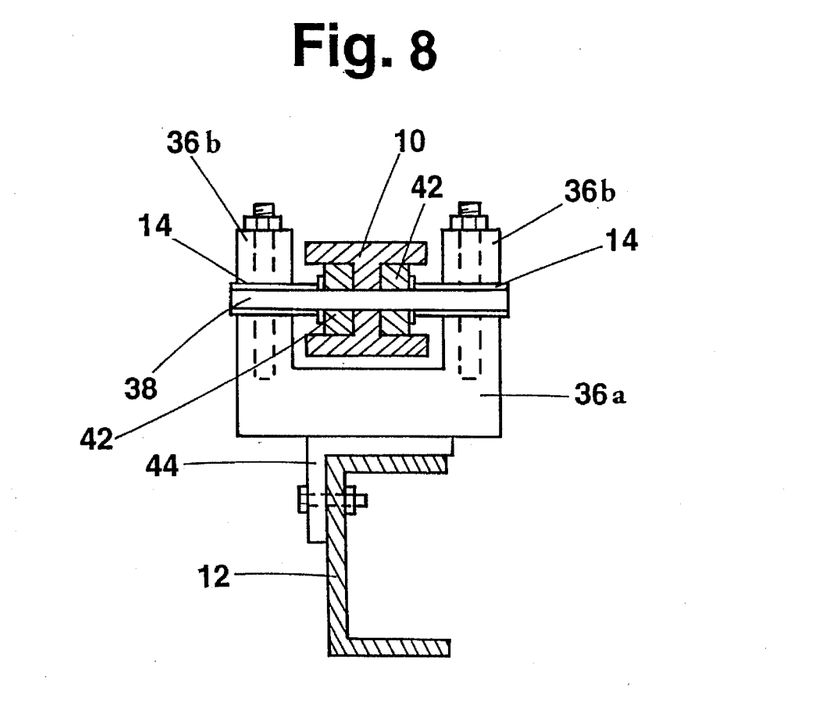
FIG. 8 is, in cross section, a view along line 8—8 in FIG. 7.

As illustrated in FIGS. 7 and 8, subframe 10 is pivotally mounted to tractor frame 12 about bushing 14. Bushing 14 is supported in bushing housing 36. As illustrated, bushing housing 36 may comprise a lower channel member 36a and upper clamp members 36b which may be bolted by bolts 36c into place on the side flanges of the channel member 36a so as to support an axle 38 extending between the side flanges of channel member 36a clamped into place between the upper clamp members 36b and the lower channel member 36a. Axle 38 is journalled in bushings 14. Subframe 10 and subframe reinforcement members 42 have bushings 14 and axle 38 journalled therethrough so that subframe 10 is free to pivot about axle 38. Subframe reinforcement members 40 may be steel bars, blocks, or the like extending partially along subframe 10, and snugly fit into the "I"-beam channels (if subframe 10 is constructed of "I"-beam members) so as to extend from either side of axle 38 along subframe 10.

Bushing housing 36 pivotally supporting subframe 10 is mounted to tractor frame 12 by means of mounting bracket 44 welded to the bottom of bushing housing 36 and bolted to tractor frame 12.

In an alternative embodiment, rubber load cushions comprising a rubber pad having metal plates bonded to either side may be placed between wear pad 16 and plate 18a. Rubber load cushions may be secured between guides 26 laterally and, in a longitudinal direction, between raised flanges (not shown) on plate 18a. Subframe 10 members 22 may also be straight rather than curved or bent as illustrated. Bushing 14 and axle 38 might also be a trunnion (solid or tube), or a free-floating securement to provide the pivotal mounting of subframe 10 to tractor frame 12. Also, alternative to the front end of subframe 10 resting on axle 20, the front end of subframe 10 could be attached to an adapted section of suspension, in a similar manner to that set out above, and illustrated in FIGS. 3 and 4. The adapted section of suspension would then transfer the weight from subframe 10 to axle 20.

Figure 9:
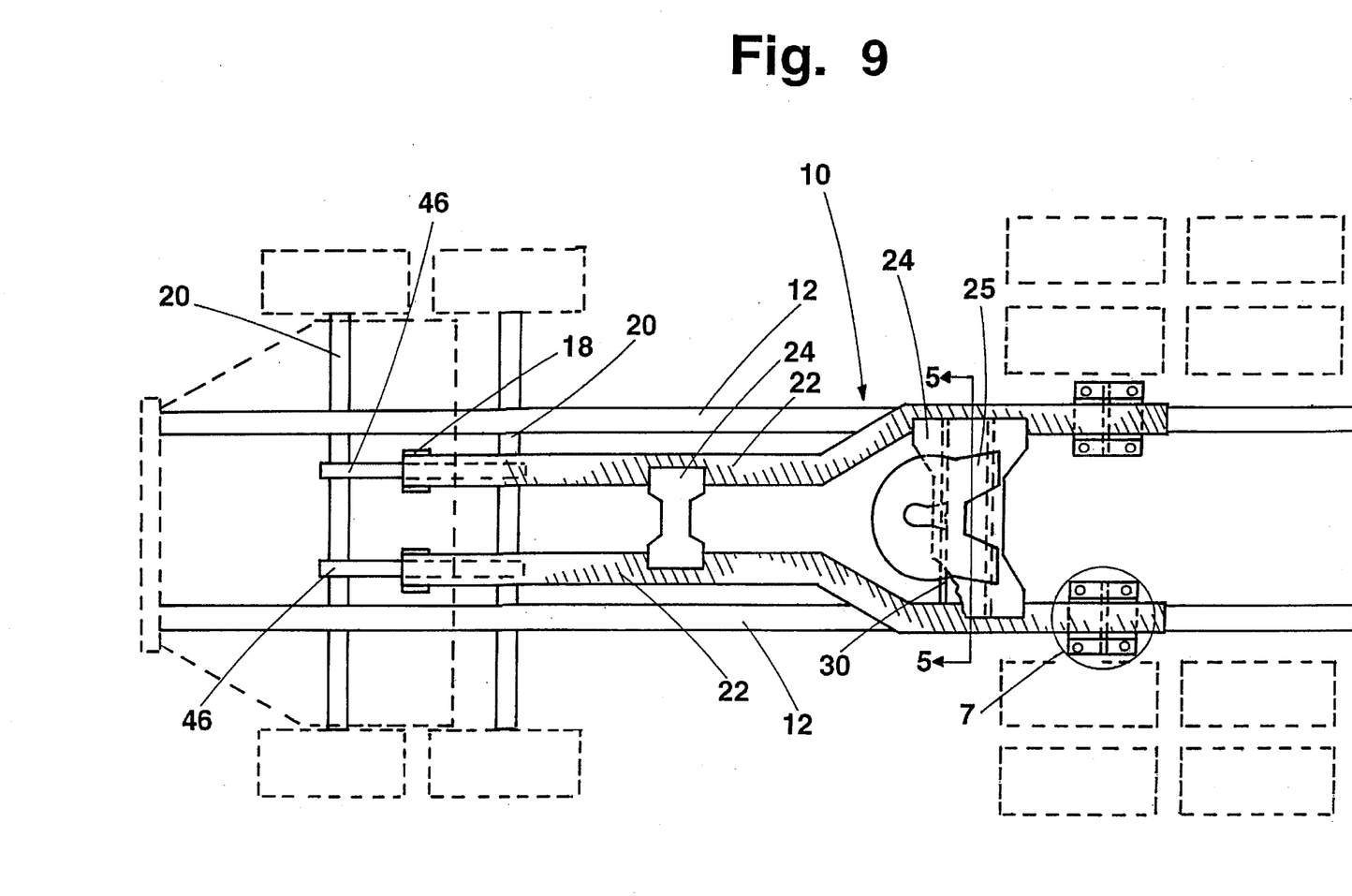
FIG. 9 is, in plan view, an alternative embodiment of the load transfer arrangement of FIGS. 1 and 2.
Figure 10:
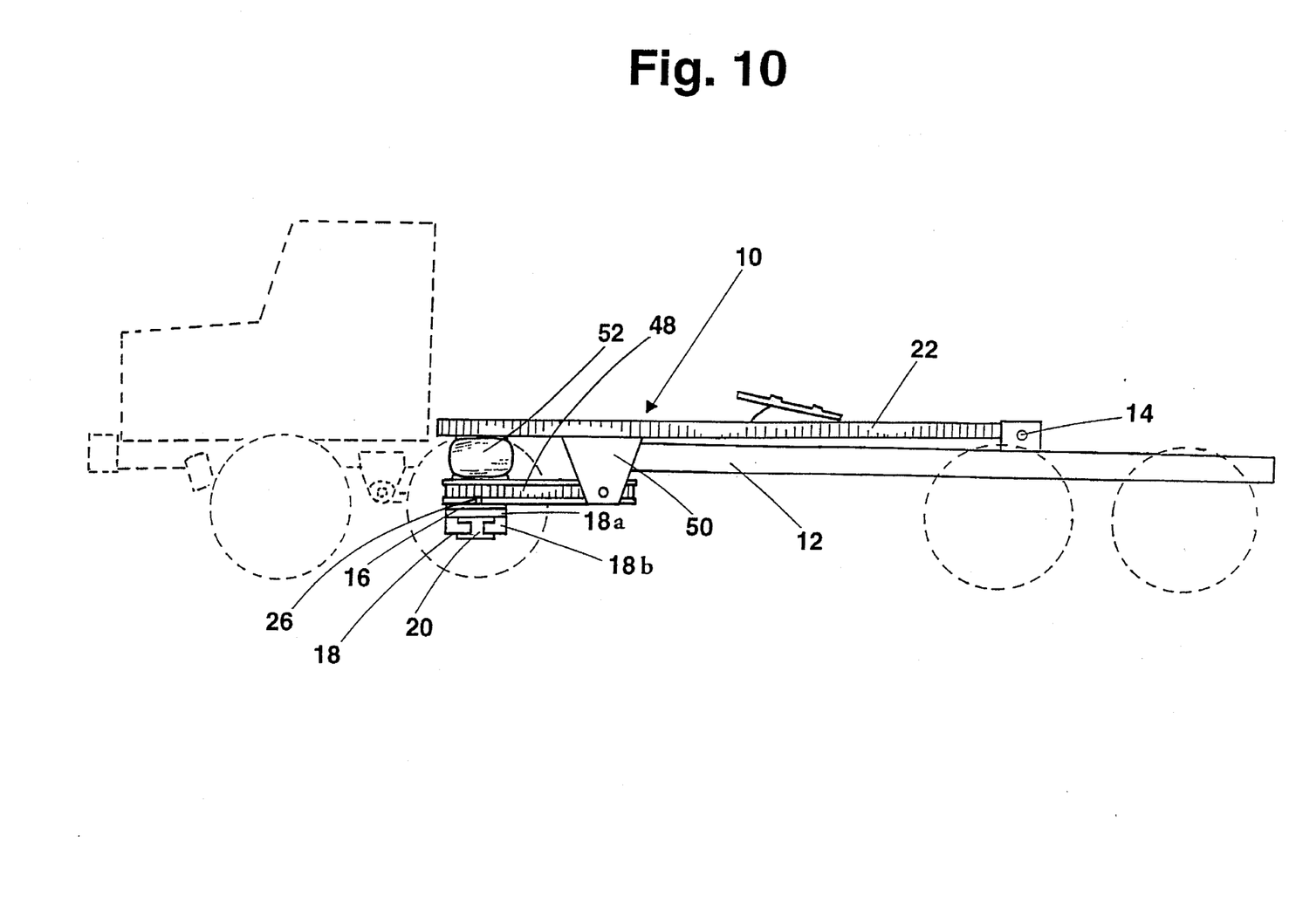
FIG. 10 is, in side elevation view, an alternative embodiment of the load transfer arrangement of FIGS. 1 and 2.
Figure 11:
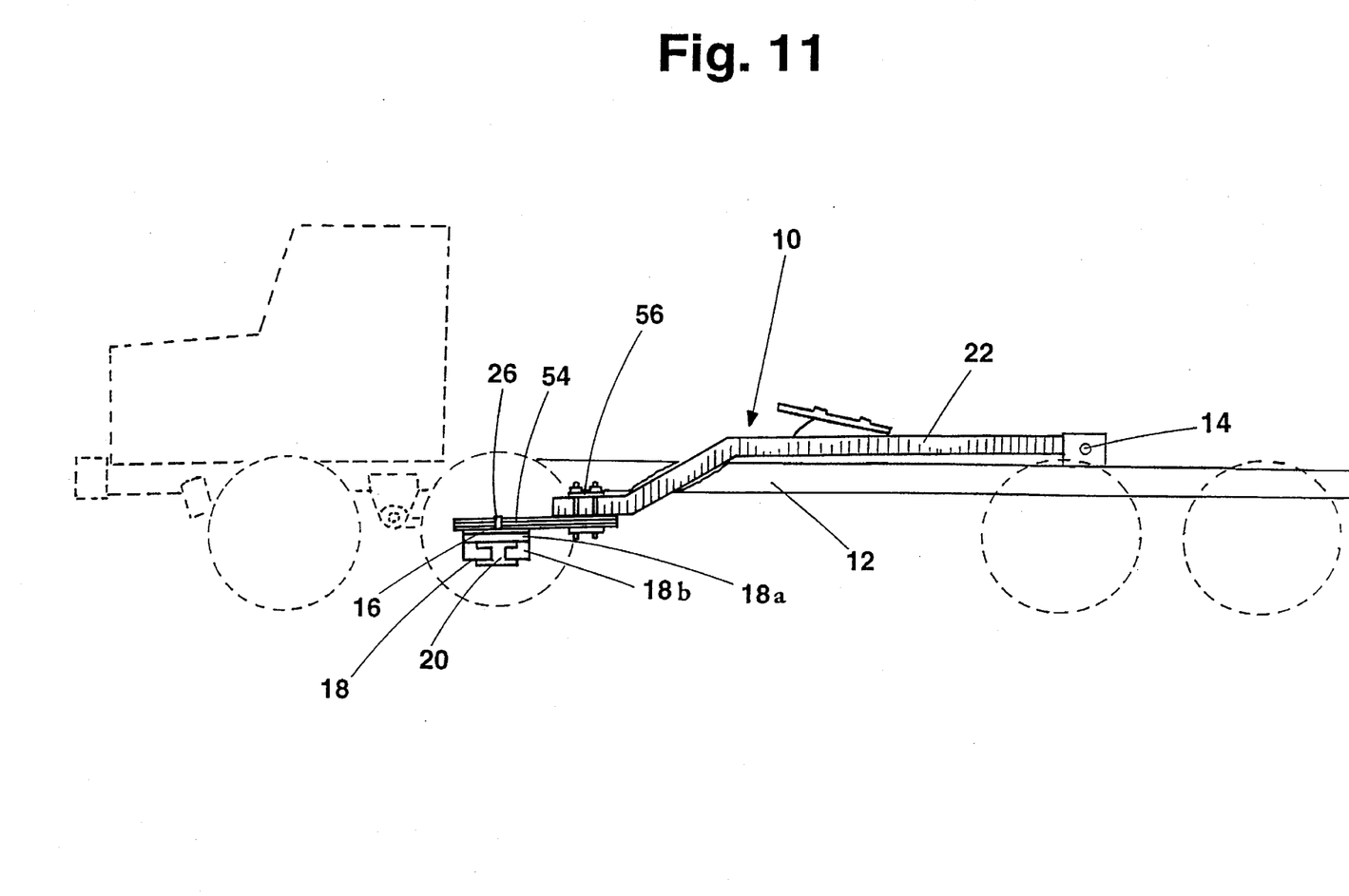
FIG. 11 is, in side elevation view, a further alternative embodiment of the load transfer arrangement of FIGS. 1 and 2.
Figure 12:
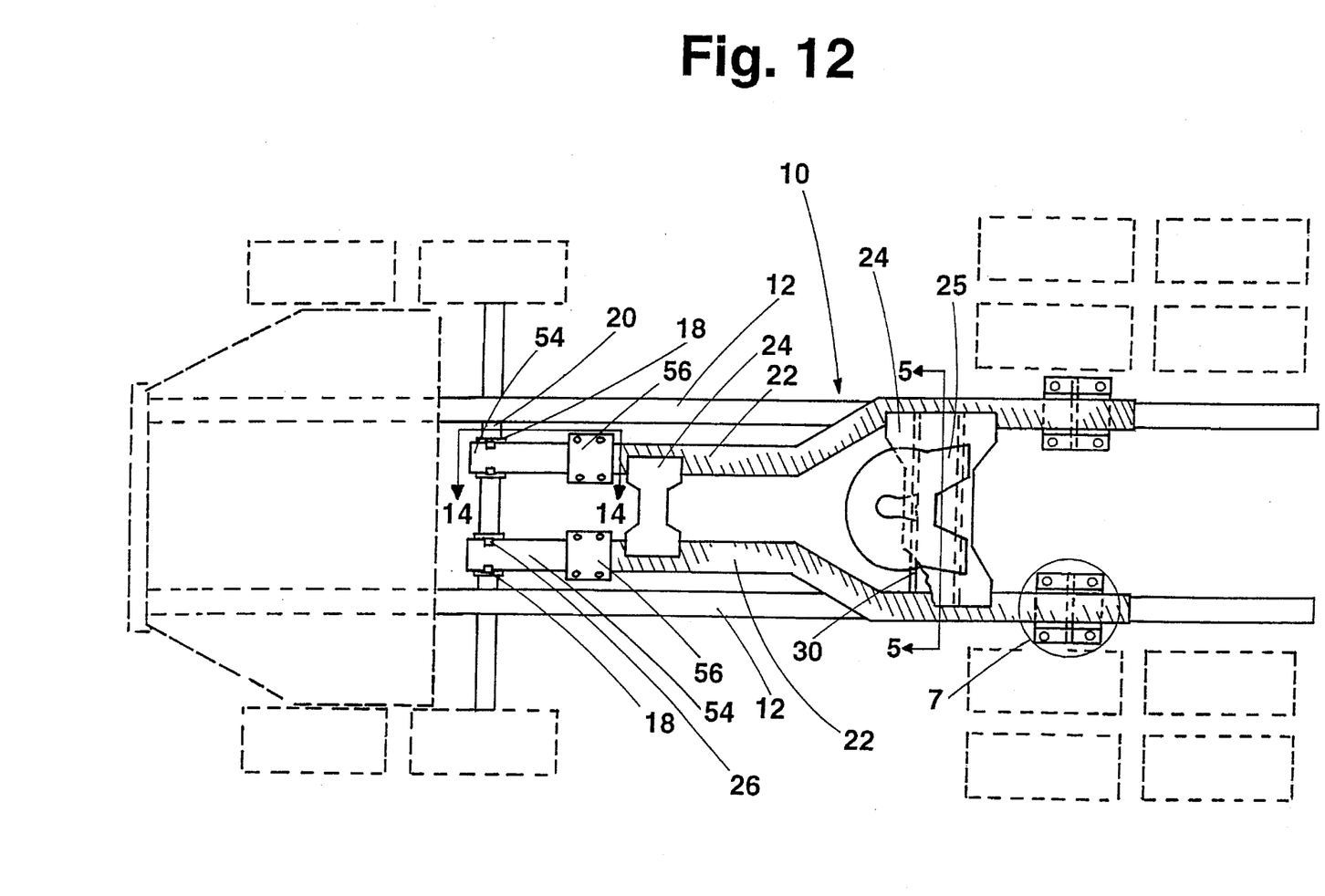
FIG. 12 is, in plan view, the further alternative embodiment load transfer arrangement of FIG. 11.
Figure 13:
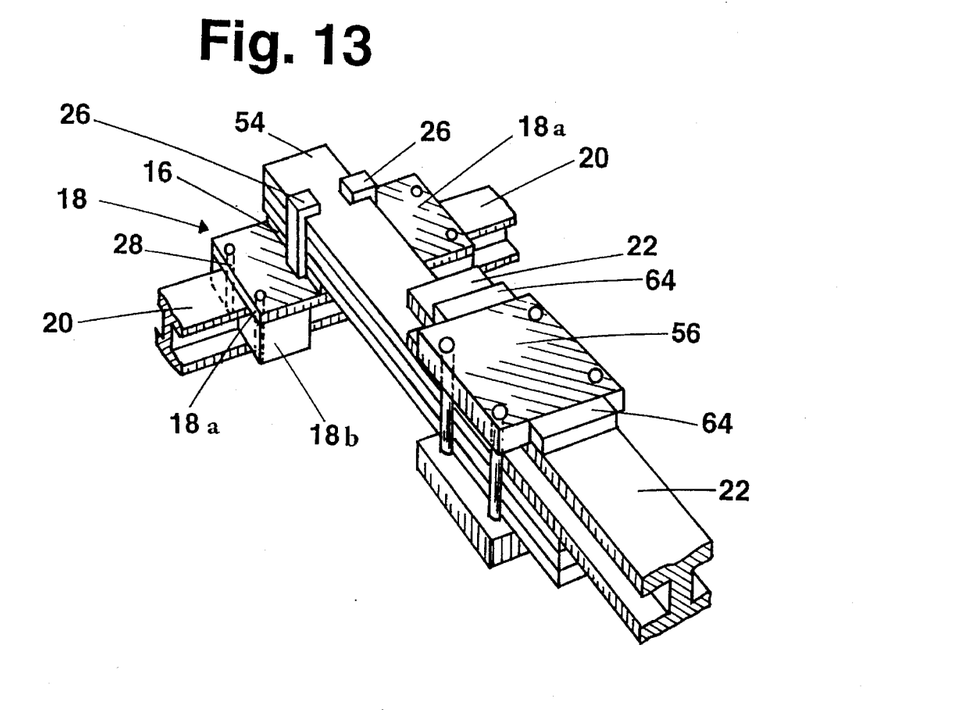
FIG. 13 is, in perspective view, a detailed break out from FIG. 12.

FIG. 9 illustrates an alternative embodiment of the load transfer arrangement illustrated in FIG. 2, applicable to the situation where the rear steering axle suspension is not adjustable. Thus, in order to balance the load being applied between the front and rear steering axles, a pair of parallel bridging members 46 are provided. Bridging members 46 extend longitudinally between front and rear steering axles 20 substantially aligned with longitudinal subframe members 22 and are mounted to steering axles 20 in a conventional manner known to those skilled in the art. Longitudinal subframe members 22 may then be mounted to bridging members 46 approximately midway between steering axles 20 by means such as described above for mounting longitudinal subframe members 22 to the rear steering axle.

FIGS. 10 through 14 illustrate further alternative embodiments for free-floating securement of longitudinal subframe members 22 to I-beam steering axle 20. For example, in FIG. 10, trailing arm 48, also of I-beam construction, is held within an opposed pair of guides 26 in a manner similar to how, in FIG. 3, member 22 is held by guides 26. Trailing arm 48 is pivotally mounted, towards its rear-most end, to bracket 50. Mounted between trailing arm 48 and longitudinal member 22 is conventional suspension airbag 52 which may be of a type such as used in suspension model RUL-245 manufactured by Ridewell Corporation of Springfield, Mo. Airbag 52 would maintain the requisite distance and a cushion between longitudinal member 22 and trailing arm 48. Alternatively, airbag 52, which conventionally is manufactured with its own mounting plates attached to the top and bottom surfaces thereof, could be mounted directly to I-beam steering axle 20 by conventional means known in the art thus removing trailing arm 48 and bracket 50. It is understand that, although not illustrated in FIG. 10, the alternative embodiment illustrated in FIG. 10 would also incorporate a matching opposed set of trailing arm 48, bracket 50 and airbag 52 corresponding to a second opposed longitudinal member 22.

Figure 14:
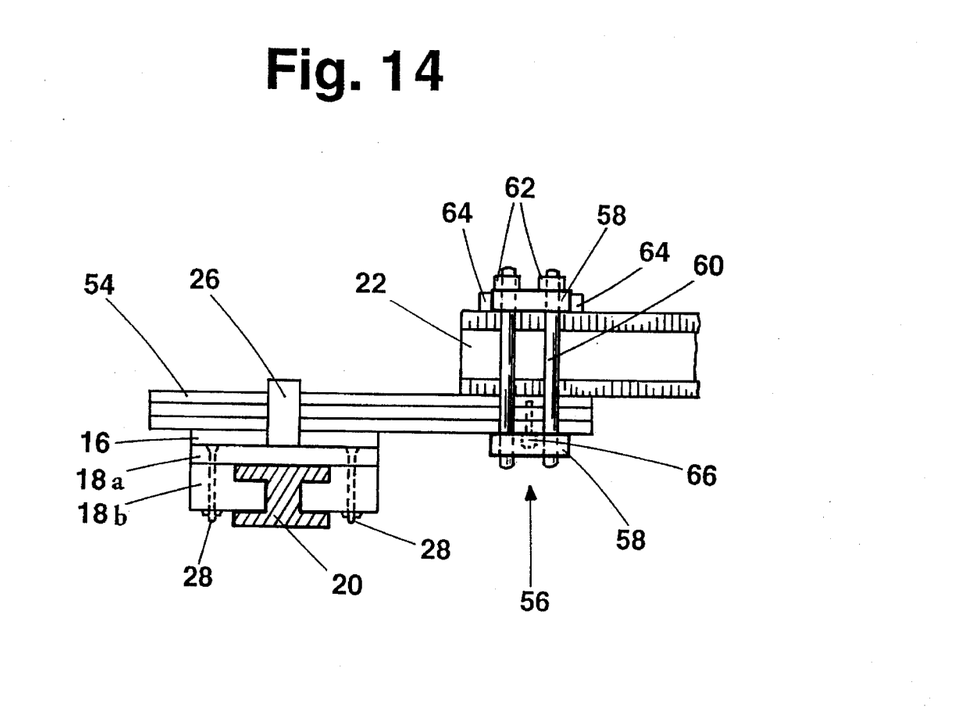
FIG. 14 is a cross sectional view along line 14—14 in FIG. 12.

As illustrated in FIGS. 11 through 14, a further alternative embodiment for the free-floating securement of longitudinal members 22 to I-beam steering axle 20 incorporates leaf-spring pack 54 between I-beam steering axle 20 and longitudinal subframe member 22. The forward end of leaf-spring pack 54 may be supported within guides 26 on wear pad 16, the rearward end of leaf-spring pack 54 secured to the forward end of member 22 by a conventional clamping arrangement such as bolt and plate clamp 56. In particular bolt and plate clamp 56 may, as illustrated in FIG. 14, include an opposed pair of clamp plates 58 having clamped therebetween leaf-spring pack 54 and longitudinal subframe member 22 under the clamping force of U-bolts 60 secured by nuts 62. Positioning stops 64, rigidly mounted to the upper surface of member 22, may be included to prevent longitudinal movement of bolt and clamp 56 relative to member 22. The position of bolt and plate clamp 56 relative to leaf-spring pack 54 may be maintained by securing the lower of clamp plates 58 to leaf-spring pack 54 by bolt 66 (shown in broken outline). Leaf-spring pack 54 thus mounted allows I-beam steering axle 20 to oscillate more freely, independent of longitudinal subframe member 22. It is understood that conventional shock absorbers (not shown, possibly of a conventional automotive type) could be incorporated to dampen vertical or oscillatory motion of longitudinal subframe member 22 relative to I-beam steering axle 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A weight transfer subframe for a tandem steer tractor, said tractor having a tractor frame, comprising a longitudinal subframe member having forward and rearward ends, said longitudinal subframe member pivotally mounted at said rearward end to said tractor frame and said forward end of said longitudinal subframe member adapted for vertical engagement with a weight bearing member of said tractor, said weight bearing member of said tractor for transferring weight to an opposed pair of front wheels of said tractor, a load transfer trailer coupling device mountable on said longitudinal subframe member between said forward and rearward ends, wherein said longitudinal subframe member comprises an opposed pair of longitudinal members pivotally mounted at their rearward ends to said tractor frame at a rearward location on said tractor frame and said load transfer trailer coupling device mounted to a cross member extending between said opposed longitudinal members, said weight transfer subframe further comprising vertical engagement means for securing said longitudinal subframe member in vertical relation to said weight bearing member whereby said longitudinal subframe member may move a small distance longitudinally over said weight bearing member and said longitudinal subframe member may rotate about said weight bearing member to a small degree, wherein said weight bearing member is a steering axle, and wherein said steering axle is a rearmost steering axle on said tandem steer tractor.

2. A weight transfer subframe for a tandem steer tractor, said tractor having a tractor frame, comprising a longitudinal subframe member having forward and rearward ends, said longitudinal subframe member pivotally mounted at said rearward end to said tractor frame and said forward end of said longitudinal subframe member adapted for vertical engagement with a weight bearing member of said tractor, said weight bearing member of said tractor for transferring weight to an opposed pair of front wheels of said tractor, a load transfer trailer coupling device mountable on said longitudinal subframe member between said forward and rearward ends, wherein said longitudinal subframe member comprises an opposed pair of longitudinal members pivotally mounted at their rearward ends to said tractor frame at a rearward location on said tractor frame and said load transfer trailer coupling device mounted to a cross member extending between said opposed longitudinal members, said weight transfer subframe further comprising vertical engagement means for securing said longitudinal subframe member in vertical relation to said weight bearing member whereby said longitudinal subframe member may move a small distance longitudinally over said weight bearing member and said longitudinal subframe member may rotate about said weight bearing member to a small degree, wherein said weight bearing member extends between an opposed pair of steering axles, said opposed pair of steering axles for steering said tandem steer tractor.

3. A weight transfer subframe for a tandem steer tractor, said tractor having a tractor frame, comprising a longitudinal sub frame member having forward and rearward ends, said longitudinal sub frame member pivotally mounted at said rearward end to said tractor frame and said forward end of said longitudinal subframe member adapted for vertical engagement with a weight bearing member of said tractor, said weight bearing member of said tractor for transferring weight to an opposed pair of front wheels of said tractor, a load transfer trailer coupling device mountable on said longitudinal subframe member between said forward and rearward ends, wherein said longitudinal subframe member comprises an opposed pair of longitudinal members pivotally mounted at their rearward ends to said tractor frame at a rearward location on said tractor frame and said load transfer trailer coupling device mounted to a cross member extending between said opposed longitudinal members, said weight transfer subframe further comprising vertical engagement means for securing said longitudinal subframe member in vertical relation to said weight bearing member whereby said longitudinal subframe member may move a small distance longitudinally over said weight bearing member and said longitudinal subframe member may rotate about said weight bearing member to a small degree, wherein said vertical engagement means comprises a clamp mountable to said weight bearing member for clamping at least partially over said longitudinal subframe member, said clamp comprising means for preventing vertical and lateral movement of said longitudinal subframe member relative to said weight bearing member, said clamp being adapted to allow said longitudinal subframe member to move said small distance longitudinally over said weight bearing member and to rotate about said weight bearing member to said small degree.

4. The device of claim 3 wherein said means for preventing vertical and lateral movement of said longitudinal subframe member relative to said weight bearing member comprises an opposed pair of inwardly facing angle brackets.

5. The device of claim 3 wherein said longitudinal subframe member is pivotally mounted to said tractor frame about a pivot pin journalled through said rearward end of said longitudinal subframe member, said pivot pin mounted in pivot pin supports attached to said tractor frame.

6. The device of claim 5 wherein said pivot pin is a bushing mounted axle.

7. The device of claim 3 wherein said rearward end of said longitudinal subframe member is pivotally mounted to said tractor frame in proximity to a rear drive axle of said tractor and said load transfer coupling device is located longitudinally along said longitudinal subframe member between said forward and rearward ends.

8. A weight transfer subframe for a tandem steer tractor, said tractor having a tractor frame, comprising a longitudinal subframe member having forward and rearward ends, said longitudinal subframe member pivotally mounted at said rearward end to said tractor frame and said forward end of said longitudinal subframe member adapted for vertical engagement with a weight bearing member of said tractor, said weight bearing member of said tractor for transferring weight to an opposed pair of front wheels of said tractor, a load transfer trailer coupling device mountable on said longitudinal subframe member between said forward and rearward ends, wherein said weight bearing member is a steering axle, and wherein said steering axle is rearmost steering axle on said tandem steer tractor.

* * * * *